United States Patent
Bienert et al.

[11] Patent Number: 4,984,332
[45] Date of Patent: Jan. 15, 1991

[54] SLIDE SHOE

[75] Inventors: Horst Bienert, Gauting; Max Bauer, Schondorf, both of Fed. Rep. of Germany

[73] Assignee: Webasto AG Fahrzeugtechnik, Gauting, Fed. Rep. of Germany

[21] Appl. No.: 525,732

[22] Filed: May 21, 1990

[30] Foreign Application Priority Data

Jun. 22, 1989 [DE] Fed. Rep. of Germany ....... 3920372

[51] Int. Cl.⁵ ............................................ E05D 13/02
[52] U.S. Cl. .................................... 16/93 R; 16/93 D
[58] Field of Search ............................. 16/93 R, 93 D

[56] References Cited

U.S. PATENT DOCUMENTS 3,671,997  6/1972  Sigmund ............................ 16/93 R
4,114,945  9/1978  Lutz .................................... 16/93 R

FOREIGN PATENT DOCUMENTS 2553549  12/1978  Fed. Rep. of Germany .

Primary Examiner—Richard K. Seidel
Assistant Examiner—Carmine Cuda
Attorney, Agent, or Firm—Sixbey, Friedman, Leedom & Ferguson

[57] ABSTRACT

Slide shoe for sliding roofs, sliding lifting roofs and the like. The slide shoe has a slide shoe body made of rubber, which can be mounted onto a slide shoe carrier, and which, in an assembled state, is displaceably guided in a longitudinal guideway which is essentially U-shaped in cross section. A slide casing made of synthetic material is placed over the slide shoe carrier, which is made of soft rubber.

19 Claims, 1 Drawing Sheet

SLIDE SHOE

BACKGROUND OF THE INVENTION

The invention relates to a slide shoe for sliding roofs, sliding lifting roofs, and the like, having a slide shoe body made of rubber which can be mounted onto a slide shoe carrier, and which, in an assembled state, is displaceably guided in a longitudinal guideway of essentially U-shaped configuration.

In a known slide shoe of this kind (German patent No. 25 53 549) the slide shoe body is provided at three sides, in the area of its slide surfaces, with a friction reducing laminated coating of slidable PTEE or a coating of flocked low-friction material, like polyamide. Rubber slide shoes with flocked PTEE coatings, however, are difficult to manufacture and, consequently, are expensive. Furthermore, rubber slide shoes coated or flocked with low-friction materials have relatively rough slide surfaces and require lubrication in an undesirable manner. In addition, friction noises cannot be eliminated, particularly at temperatures of 60 degrees or higher and at times of transverse movement (cornering).

Synthetic slide shoes are also known from U.S. Pat. No. 3,671,997, which slide shoes have an inserted pretensioned steel spring for the purpose of tolerance equalization. In practice, such slide shoes have the disadvantage that the steel spring sets after some use, causing rattling noises to occur.

SUMMARY OF THE INVENTION

The present invention has a primary objective to provide a slide shoe which can be manufactured in a particularly cost-effective manner and which, even under the demanding conditions of long-time vehicle use and high temperatures, completely eliminates undesirable noises and dispenses with the need for lubrication.

This objective is achieved with a slide shoe of the kind mentioned in that a slide casing made of synthetic material is placed over a slide shoe body, made of soft rubber.

The slide shoe, in accordance with the invention, can also dispense with an additional spring, as the slide shoe body itself, made of soft rubber, serves as a spring element, facilitating the necessary tolerance equalization and the desired damping (muffling) effect. Furthermore, the use of the mounted synthetic slide casing, simultaneously, facilitates smooth, slide ways and superior slide properties without the need for lubrication of the slide shoe and without regard as to whether the longitudinal guideway consists of metal or synthetic material. The slide shoe body and the slide shoe casing can be manufactured in a very simple and cost-effective manner as individual components.

These and further objects, features and advantages of the present invention will become more obvious from the following description when taken in connection with the accompanying drawings which show, for purposes of illustration only, an embodiment in accordance with the present invention.

DETAILED DESCRIPTION OF THE PREFERRED EMBODIMENT

Figure 3:
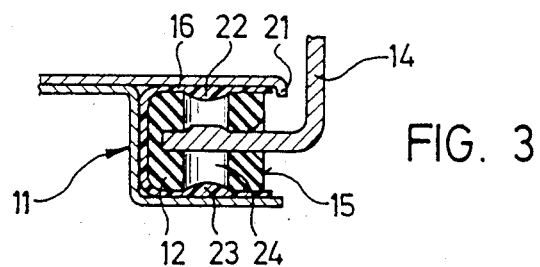
FIG. 3 is a sectional view along line III—III in FIG. 1.

A slide shoe 10 is longitudinally displaceable in a slide rail 11, which cross-sectionally has a U-shaped configuration. The slide shoe 10 has a slide shoe body 12, made of rubber. In the center part of the slide shoe body 12, there is longitudinal groove 13. The slide shoe body 12 is mounted onto a slide shoe carrier 14, which engages a longitudinal groove 13 (FIG. 3) from the mounting side 15 of the slide shoe body. The slide shoe carrier 14 may be connected with the displaceable portion of a sliding roof, sliding-lifting roof, or similar roof, in a known manner which is not further depicted. Slide shoe body 12 is made of soft rubber, preferably of a polychloroprene caoutchouc having a shore A hardness of 30 to 50, and preferably of about 40.

Figure 1:
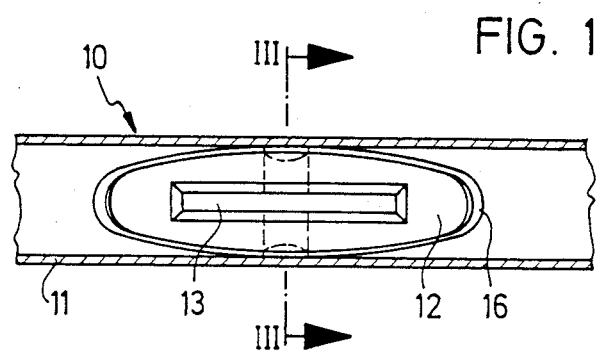
FIG. 1 is a side view of a slide shoe arranged in an U-shaped guide rail.
Figure 2:
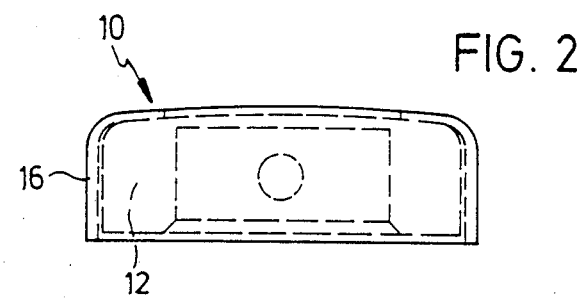
FIG. 2 is a top view of the slide shoe of FIG. 1.
Figures 4, 5:
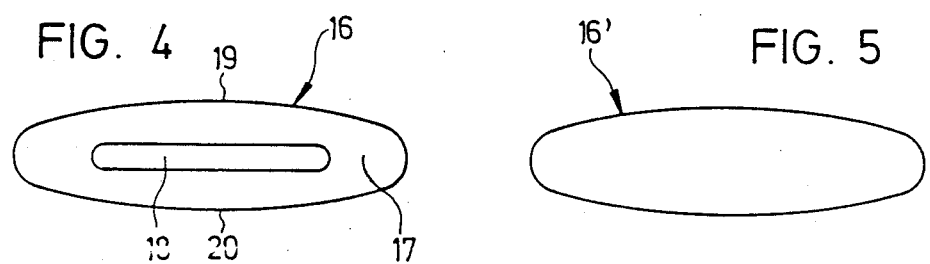
FIG. 4 is a side view of the slide shoe viewed in the direction of the arrow in FIG. 2.
FIG. 5 is a side view in accordance with FIG. 4, depicting a variation thereof.

A slide casing 16, made of synthetic material is placed over slide shoe body 12 and envelopes slide shoe body 12 except for the mounting side 15. For small guideway tolerances, a slide casing 16' can be provided, which is closed on all sides, except for mounting side 15 (FIG. 5). Larger guideway tolerances can be equalized when, in accordance with the preferred embodiment (FIGS. 3 and 4), the slide casing 16 is slotted on the side 17 that is at the opposite side of body 12 from mounting side 15. To this end, it is preferred that there is an elongated slot 18 in the face of side 17 which extends over a major extent of the longitudinal dimension of the slide casing 16, and which has approximately the same distance from the two longitudinal sides 19 and 20 of slide casing 16. In every instance, slide shoe body 12 and slide casing 16 or 16' appropriately have a pontoon-shaped configuration when viewed from the side, as is depicted in FIGS. 1, 4 and 5. On mounting side 15, slide casing 16 extends a small amount beyond slide shoe body 12 in a transverse direction, ensuring that only slide casing 16, but not slide shoe body 12, can bear against the retaining lip 21 of slide rail 11, thereby preventing slide shoe 10 from laterally slipping out of slide rail 11.

Slide casing 16 has a latching bulge 22, 23 formed at the inner surface of each of longitudinal sides 19 and 20, respectively. The slide shoe body 12 has a continuous vertical receiving bore 24. When mounting slide casing 16 onto slide shoe 12, the facing latching bulges 22 and 23, insert themselves into the opposite ends of receiving bore 24, thereby securing slide shoe body 12 within slide casing 16.

Slide casing 16, 16' is made of a low friction, synthetic plastic material having good sliding properties and being harder than the material of which the slide shoe body 12 is made. A material which is particularly suitable for the manufacture of the slide casing 16, 16' is high density polyethylene (HDPE), an isotactic or elastomerically modified polypropylene, an acetal copolymerisate on a trioxane basis, or a polyoxymethylene with an addition of polytetrafluorethylene. Preferably, slide casing 16, 16' has a Shore A hardness in the range of 60-80, with a Shore A hardness of about 70 having proven to be particularly advantageous. In order to eliminate noises occurring between slide shoe body 12 and slide shoe carrier 14, slide shoe body 12 is dusted with talcum powder, or a similar substance, before assembly.

Accordingly, the slide shoe described above can be manufactured in a particularly simple manner and has the advantage that superior slide properties are obtained without requiring lubrication. Further, by reason of the elasticity of slide shoe body 12 and slide casing 16, 16', tolerances are effectively equalized. Rattling noises and other noises do not occur even in long term use of the slide shoe. Clearance between the slide shoe body 12 and slide casing 16, 16' at the longitudinal sides permit that the tolerances required for the materials used can be equalized without problems.

While I have shown and described an embodiment in accordance with the present invention, it is understood that the same is not limited thereto, but is susceptible of numerous changes and modifications as known to those skilled in the art, and I, therefore, do not wish to be limited to the details shown and described herein, but intend to cover all such changes and modifications as are encompassed by the scope of the appended claims.

We claim:

1. Slide shoe for slidably carrying a roof cover panel in a sliding motion, the slide shoe having a slide shoe body made of rubber with means for mounting the slide shoe onto a slide shoe carrier, and a preferred slide casing made of synthetic plastic material which is mounted by being slid over the rubber slide shoe body.

2. Slide shoe according to claim 1, wherein the slide casing encases the slide shoe body except at a mounting side at which the slide shoe carrier is engagable with said means for mounting.

3. Slide shoe according to claim 2, wherein the slide shoe casing is slotted on a side located opposite said mounting side.

4. Slide shoe according to claim 3, wherein the slot is an elongated slot which extends across a major extent of the length of the slide casing.

5. Slide shoe according to claim 4, wherein the elongated slot is approximately the same distance from longitudinal sides forming sliding surfaces of the slide casing.

6. Slide shoe according to claim 2, wherein the slide shoe body and slide casing have a pontoon-shaped configuration in side elevation.

7. Slide shoe according to claim 6, wherein the slide casing projects beyond the mounting side of the slide body.

8. Slide shoe according to claim 6, wherein an inner surface of at least one of longitudinal sides of the slide shoe casing has at least one inwardly projecting latching bulge which projects into a coordinated bore opening of the slide shoe body.

9. Slide shoe according to claim 8, wherein the slide casing has a latching bulge on the inner surface of a pair of opposite longitudinal sides and the slide shoe body is provided with a continuous receiving bore having a bore opening for accepting a respective latching bulge at each of opposite ends thereof.

10. Slide shoe according to claim 8, wherein the slide shoe body has a Shore A hardness of about 40 and the slide casing has a Shore A hardness of about 70.

11. Slide shoe according to one of claim 2, wherein the slide shoe body has a Shore A hardness of 30 to 50.

12. Slide shoe according to claim 11, wherein the slide casing has a Shore A hardness of 60 to 80.

13. Slide shoe according to claim 2, wherein the slide shoe body is made of polychloroprene caoutchouc.

14. Slide shoe according to claim 13, wherein the slide casing is made of a material from the group consisting of a high density polyethylene (HDPE), an isotactic or elastomerically modified polypropylene, an acetal copolymerisate on a basis of trioxane, or, polyoxymethylene with an addition of polytetrafluorethylene.

15. Slide shoe according to claim 2, wherein said mounting means comprises a longitudinal groove formed in the slide body, the longitudinal groove opening into said mounting side.

16. Slide shoe according to claim 15, wherein the slide shoe body is powdered with a dry lubricant substance.

17. Slide shoe according to claim 2, wherein an inner surface of at least one of longitudinal sides of the slide shoe casing has at least one inwardly projecting latching bulge which projects into a coordinated bore opening of the slide shoe body.

18. Slide shoe according to claim 17, wherein the slide casing has a latching bulge on the inner surface of a pair of opposite longitudinal sides and the slide shoe body is provided with a continuous receiving bore having a bore opening for accepting a respective latching bulge at each of opposite ends thereof.

19. Slide shoe according to claim 2, wherein the slide shoe body has a Shore A hardness of about 40 and the slide casing has a Shore A hardness of about 70.

* * * * *